United States Patent [19]
Brunstetter

[11] 3,762,616
[45] Oct. 2, 1973

[54] CAMERA HOLSTER

[75] Inventor: Frank H. Brunstetter, San Antonio, Tex.

[73] Assignee: Invention Services Corporation, Denver, Colo.

[22] Filed: May 3, 1971

[21] Appl. No.: 139,496

[52] U.S. Cl................. 224/26 R, 224/2 B
[51] Int. Cl............................. A45c 11/38
[58] Field of Search............ 224/5.12, 5.13, 5 A, 224/2.4, 2.5, 2.6, 26.3, 26.9, 28.2, 28.7, 2 A, 2 B, 2 C; 2/252, 260; 150/52 R

[56] References Cited
UNITED STATES PATENTS

| 1,696,708 | 12/1928 | Brauer.................. 224/2 B |
| 2,693,214 | 11/1954 | Thompson............ 150/52 R |
| 3,286,751 | 11/1966 | Dishart............... 224/26 R X |
| 3,520,241 | 7/1970 | Caldwell............. 224/26 R X |

Primary Examiner—Gerald M. Forlenza
Assistant Examiner—Kenneth Noland
Attorney—Reilly & Lewis

[57] ABSTRACT

An upwardly opening holster is designed to carry a camera or other similarly shaped device of the type provided with a pistol grip and for this purpose has a flap which may be detachably secured over the open end of the holster to retain a camera therein; alternately, the flap can be detachably secured away from the holder's open end so that the camera may be readily withdrawn therefrom. A belt loop is formed in the holster and a belt is included for attaching the holster to an individual. A shoulder type safety strap or bandolier can be secured to the camera pistol grip outwardly of the holster to prevent accidental dropping of the camera when it is withdrawn from the holster.

8 Claims, 6 Drawing Figures

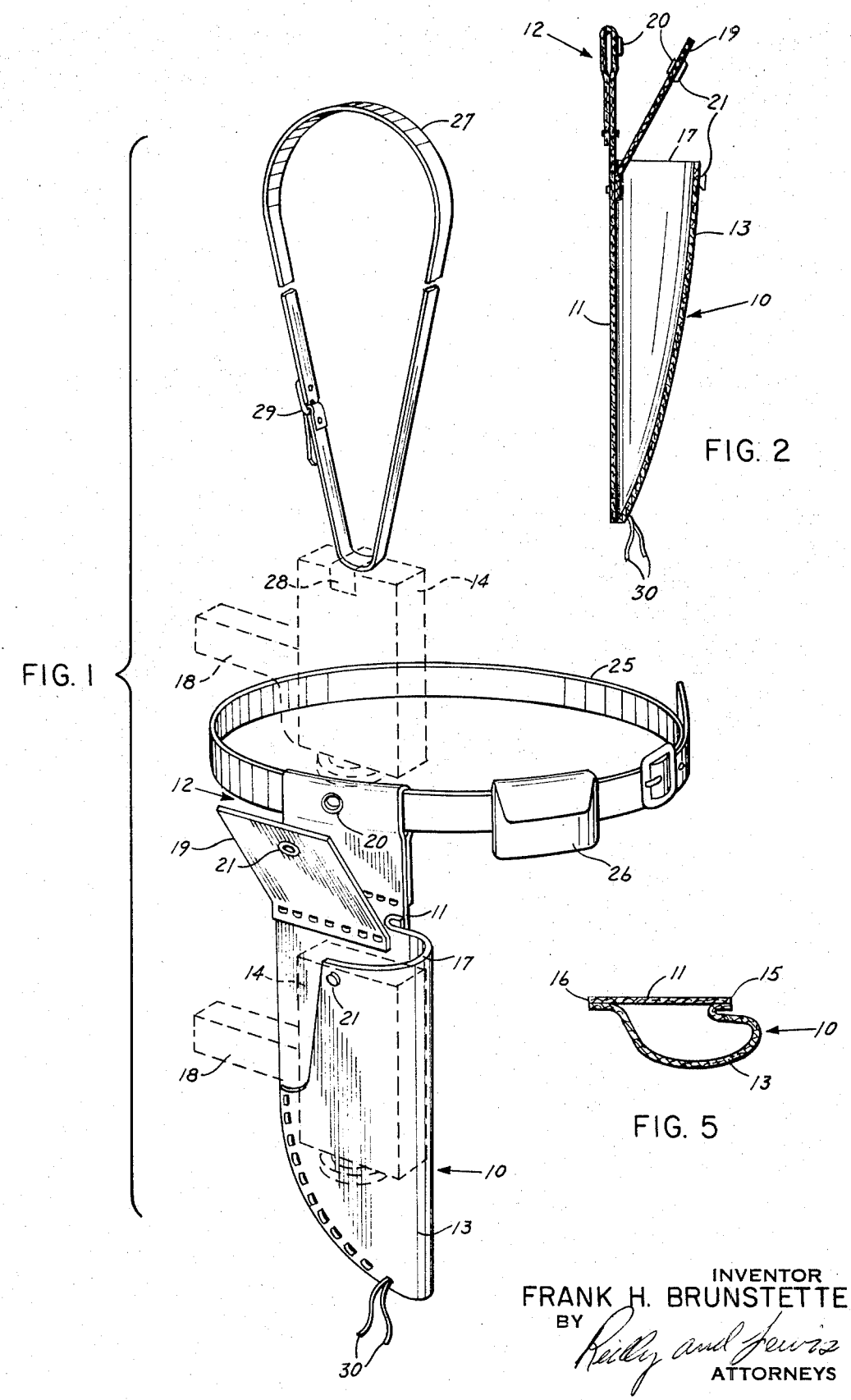

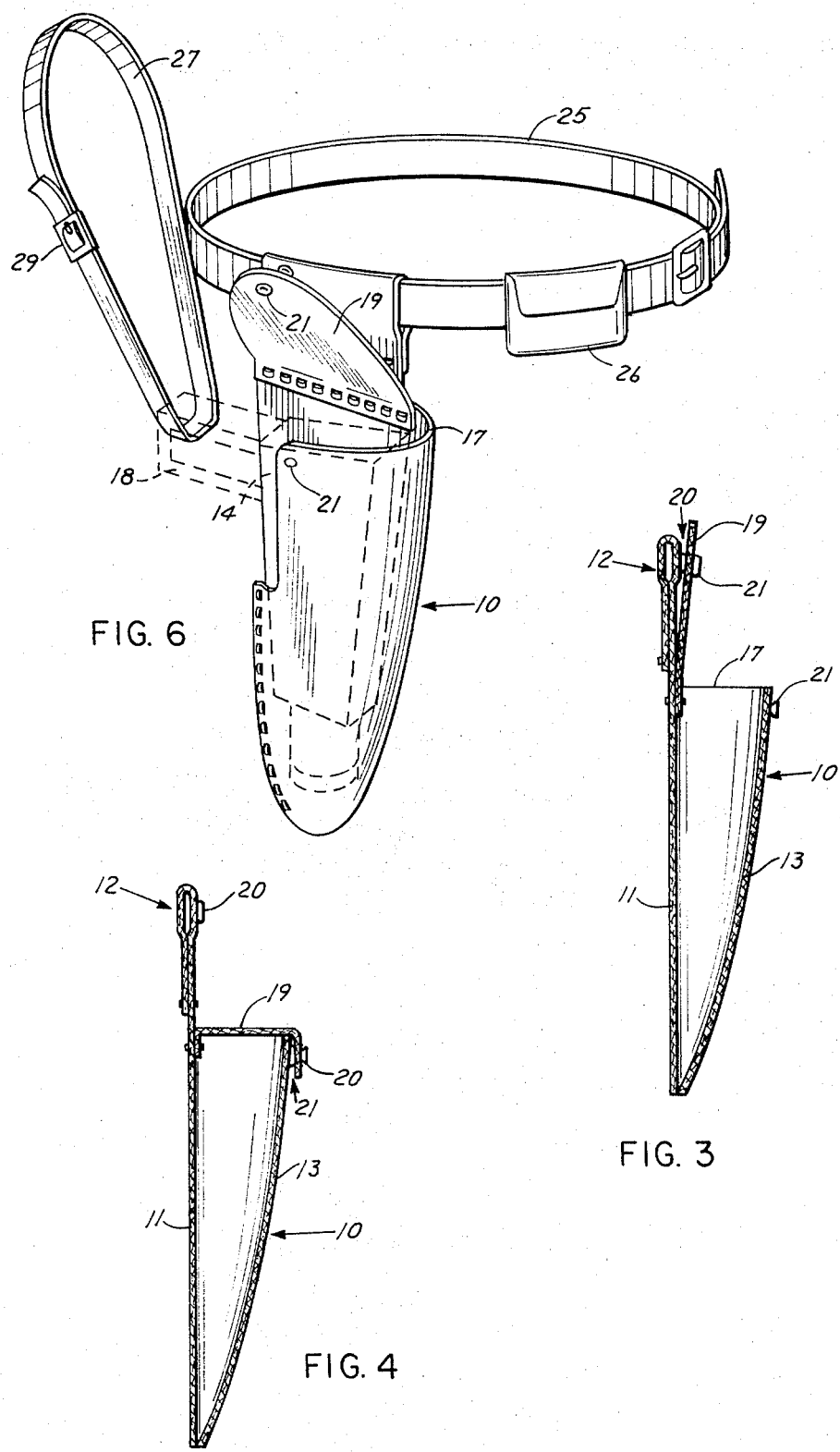

CAMERA HOLSTER

The present invention relates to novel and improved equipment holsters, and more particularly relates to an improved carrying arrangement for cameras of the type having a pistol grip, such as, motion picture film type cameras.

It has proven desirable to provide a carrying apparatus or arrangement which holds and substantially encloses a camera securely in place and which may be firmly strapped to the body when not in use and permits the camera to be quickly withdrawn for taking pictures without danger of dropping or damage.

For instance, situations frequently arise where it is necessary to transport a camera considerable distances over rough terrain to a shooting site and shoot scenes rapidly with little notice. Such is the case, for example, in the filming of wild animals in their habitat. Additionally, to take many scenes and shots it is often necessary for the photographer to position himself in precarious positions, such as, leaning from cliffs, bridges and buildings, and then shoot the scenes from these positions.

Accordingly, it is an object of the present invention to provide a camera carrying arrangement which is operable to hold and substantially enclose a camera securely in place, may be selectively adapted to permit a photographer to quickly draw the camera, and which secures the camera to the photographer's body at all times to prevent loss and breakage.

It is further an object of the present invention to provide an improved holster for attachment to a person's body which is suitable for carrying cameras having a pistol grip, such as, motion picture film type cameras, and other similarly shaped devices.

It is another object of the present invention to provide an improved camera carrying device characterized by having a novel holster with an associated shoulder safety strap.

It is also an object of the present invention to provide an improved arrangement for carrying a camera or other equipment having a pistol grip characterized by a holster with a flap which may be detachably secured in one position to hold the camera securely in the holster and in another out-of-the-way position where the camera may be easily withdrawn from the holster.

Additional objects of the present invention reside in the specific construction of the exemplary carrying arrangement hereinafter particularly described in the specification and shown in the several drawings.

In accomplishing the above and other objects, there is provided a holster having an open upper end which is designed to receive a camera having a pistol grip, such as a motion picture film type camera. A belt loop is provided on the holster so that it may be attached to a person's body at the waist. A flap is secured on the holster which has a double snap arrangement. The flap may be snap-fastened downward over the upper open end of the holster to secure a camera therein or may be snap-fastened upward to the belt loop so as to permit readily removal of the camera from the holster. An associated shoulder safety strap or bandolier type belt is provided for attaching the camera to the photographer. Thus, there is provided an improved carrying arrangement suitable for carrying cameras having a pistol grip and other similarly shaped devices which is operable to hold such a camera securely in place, may be adapted to permit fast draw of the camera and which attaches the camera to a carrier's body at all times to prevent loss and breakage.

The above and other objects, advantages and features of the present invention will become more readily appreciated and understood from a consideration of the following detailed description when taken with the accompanying drawings, in which:

FIG. 1 is a perspective view of an arrangement according to the present invention suitable for carrying cameras having a pistol grip;

FIG. 2 is a longitudinal section view of the holster of the carrying arrangement of FIG. 1 showing the holster flap in an intermediate position between its upper snapped open and lower snapped closed positions;

FIG. 3 is a longitudinal section view of the holster of the carrying arangement of FIG. 1 showing the holster flap in its upper snapped open position;

FIG. 4 is a longitudinal section view of the holster of the carrying arrangement of FIG. 1 showing the holster flap in its lower snapped closed position;

FIG. 5 is a transverse section view of the holster of the carrying arrangement of FIG. 1; and FIG. 6 is a perspective view of a slightly modified form of the carrying arrangement of FIG. 1.

Referring to the drawings in more detail, there is shown in FIGS. 1–5 a holster 10 made of a substantially flat backing piece 11. The piece 11 is folded over at its upper end and sewn with a transverse running seam or otherwise secured to form a belt loop 12. Sewn with longitudinal extending seams or otherwise secured on the backing piece 11 is a holder pocket or pouch portion 13 which is shaped to receive the body portion of a motion picture film type camera 14 which is shown in dashed lines. The body portion of the camera 14 is generally oblong in shape and the backing piece 11 and holder portions 13 are appropriately shaped for conforming to and snugly holding the camera body. As shown in FIG. 3, the portion 13 of the holster 10 has a cross-section which preferably bends where it is attached to the forward edge 15 of the piece 11 to extend forward therefrom and is curved rearwardly to attach to the rear edge 16 of the piece 11. Further, the holster portion 13 opens at its upper end 17 while being sewn or otherwise secured closed against the piece 11 at its lower end.

The camera 14 shown positioned in the holster 10 has a rearwardly extending pistol type handle grip 18 and, to accommodate the grip 18, a part of the upper rear edge of the holster portion 13 is cutaway to form a recessed opening 13' which supports the grip and permits it to extend rearwardly from the holster 10. A flexible flap 19 is sewn or otherwise secured horizontally across the outer portion of the piece 11 directly across from the upper edge 17 of the holster portion 13. In this way, the flap 19 is attached or hinged along one of its ends to the piece 11 along a line substantially parallel to the plane of the upper holster edge 17. The flap 19 is designed so that it may be positioned flatly against the belt loop 12 so that the camera 14 may be quickly inserted or withdrawn from the holster 10 or may be alternately folded, preferably flatly, over the upper open end 17 of the holster portion 13 to secure a camera positioned therein in place and protect it from the elements. Means in the form of snap fasteners 20 and 21 are provided for securing the flap 19 in, respectively, its upper and lower positions. In the snap fastener arrangement 20, the female snap fastening portion is secured on the associated side of the flap 19. The snap fastener arrangement 21 has its male snap secured on the outer side of the holster portion 13 and its female snap secured on the associated side of the flap 19. It is noted that the specific construction of these snap fastener arrangements is only preferred and that other suitable quick closing and opening means could be employed for detachably securing the flap 19 in its upper and lower positions. Additionally, it is noted the holster pouch 13 has preferably such a configuration that its upper end 17 lies in a plane perpendicular to the flat backing piece 11 and that the belt loop 12 extends upward in line with the plane of the backing piece 12. Thereby, with flap 19 secured in its upper position, it lies substantially in the plane of the backing piece 11 and with the flap 19 secured in its lower position, it extends substantially perpendicularly from the backing piece 11.

As shown in FIG. 1, a conventional belt 25 may be inserted through the holster belt loop 12 in order to secure the holster 10 to an individual's body at the waist. It is noted, however, that the holster could be also secured by a shoulder sling or in any other appropriate manner. A film carrying case 26 may also be fitted on the belt 25. Additionally, a shoulder or camera bandolier type safety strap 27 is associated with the carrying arrangement shown in FIG. 1. The strap 27 is secured by suitable means 28 to the camera 14 and has a buckle 29 so that the length of the shoulder strap 27 may be adjusted.

In use of the carrying arrangement shown, the belt 25 is passed through the belt loop 12 and the film carrying case 26 thereon is buckled around a photographer's body at the waist. The shoulder strap 27 is next attached to the camera 14 and around the photographer's shoulders with the length of the strap 27 adjusted so that the camera 14 may be appropriately seated in the holster 10. With the camera 14 seated in the holster 10, the holster flap 19 may be snap fastened in its lower position by the snap fastener 21 to enclose the camera 14 and retain it in place. Once the photographer is ready to use the camera 14, the flap 19 may be snap-fastened in its upper position by the snap fastener 20. The photographer may now quickly and readily draw the camera by gripping the camera handle grip 18 and lifting the camera out of the holster 10, since the flap 19 is secured out of the camera's line of movement. Further, drawstrings 30 may be secured to the bottom of the holster 10, as shown in FIG. 1, and tied around the photographer's leg to hold the holster 10 stably in position, thereby to facilitate quick draw of the camera 14. If the photographer should accidentally drop the camera 14, the shoulder safety belt 27 acts to prevent the camera from falling to the ground and breaking.

A slightly modified form of the carrying arrangement shown in FIGS. 1–5 is shown in FIG. 6. The arrangement and camera shown in FIG. 6 are numbered to correspond to the numbering of FIGS. 1–5. The carrying arrangement of FIG. 6, however, has a flexible holster flap 19 with a rounded instead of a square outer end. Additionally, the camera 14 positioned in the holster 10 has a pistol grip 18 which is more near its top so that the grip 18 does not rest against the cutaway portion of the holster 10. Further, the grip 18 is made with an open center so that the camera bandolier type safety strap 27 may be passed therethrough as shown.

Thus, there has been provided an improved carrying arrangement suitable for carrying cameras of the type having a pistol type hand grip and other equipment such as a hand or portable power drill, saw, and the like. The carrying arrangement is operable to hold such a camera securely in place, may be adapted to permit fast draw of the camera and has means which attach the camera to a carrier's body at all times to prevent loss and breakage. It is noted that the holster, flap, strap and belt making up the improved carrying arrangement may be made of any suitable material, which material preferably should be relatively strong, durable and flexible or pliable, particularly the flap. Moreover, the holster may be fastened by the belt over the shoulder, instead of the waist or may be suspended from a hook or other suitable suspension means when not worn. Further, the bottom of the holster may be suitably closed either completely or in part, as appropriate, considering the shape of the article to be carried. In this connection, the holster is adaptable for carrying hand guns, such as, pistols or flare guns, although it is considered to have particular utility in carrying equipment of the type described. Moreover, the holster construction lends itself well to sale in kit form, such as, a handicraft or leathermaking kit.

It is therefore to be understood from the foregoing description of a preferred form of the present invention that various modifications and changes may be made in the specific design, construction and arrangement without departing from the spirit and scope of the present invention.

What is claimed is:

1. A holster arrangement for carrying a hand-held device of the type provided with a pistol grip comprising:
   a holster having an upper and lower end, said lower end having front and back portions defining a closed pocket to support the hand-held device therein, said upper end being open so that the device may be inserted in said holster, the upper portion of one side edge of said holster being recessed to facilitate insertion and removal of the device into and from said holster, said back portion extending upwardly beyond said upper end of the closed pocket and having means at the upper end of said back portion for attaching the holster to an individual's body;
   a flap secured on said holster adjacent its upper end;
   first fastener means on said front portion for detachably securing said flap over the upper end of said holster to retain the device in said holster; and
   second fastener means near the upper end of said back portion for detachably securing said flap along said back portion and away from the opening at the upper end of said holster so that the device may be readily withdrawn from said holster.

2. The invention recited in claim 1, wherein said means for attaching said holster to an individual's body includes a belt and a belt loop formed on the back portion of said holster.

3. The invention recited in claim 1, wherein each said first and second fastener means for securing said flap are each snap fasteners.

4. The invention recited in claim 2, wherein said first and second fastener means for securing said flap are each snap fasteners, the male and female portions of said snap fasteners being appropriately secured on said holster, flap and belt loop.

5. The invention recited in claim 4, including a shoulder safety strap for securing to the device carried by said holster whereby the device may be attached to an individual's body by said strap to prevent loss and breakage of the device when withdrawn from said holster.

6. The invention recited in claim 1, including a shoulder safety strap for securing the device carried by said holster whereby the device may be attached to an individual's body by said strap to prevent loss and breakage of the device when withdrawn from said holster.

7. A carrying arrangement for a camera having a pistol type handle grip, comprising:
  a holster made of a substantially flat backing piece with a front portion secured to said backing piece to form an upward opening pocket for holding a camera, the upper edge of said front portion extending substantially perpendicularly to the plane of said backing piece, said flat backing piece being bent over at its upper end to form a belt loop which lies substantially in the plane of said backing piece, the upper portion of one side edge of said front holster portion being cut away so that a camera having a pistol grip may be inserted in said holster by positioning the pistol grip handle at least in part in the recess formed by said cutaway portion;
  a flap pivotally secured on the outer side of said backing piece along a line substantially parallel to the plane of the upper edge of said front holster portion and adjacent to the upper end of the pocket formed by said front holster portion;
  a first snap fastener having its snap fastening portions secured on the outer upper end of said front holster portion and its associated side of said flap so that said flap may be snap fastened over the upper end of the pocket formed in said holster to extend from said backing piece substantially perpendicularly to its plane whereby to enclose and retain a camera in the pocket formed in said holster; and
  a second snap fastener having its snap fastening portions secured on the other end of the belt loop formed by said backing piece and its associated side of said flap so that said flap may be snap fastened against the backing piece substantially in line with the plane of said backing piece whereby a camera may be withdrawn from said holster.

8. The invention recited in claim 7, including:
  a belt for passage through said belt loop so that said holster may be secured to an individual's body at the waist; and
  a shoulder safety strap for securing to the camera carried by said holster whereby the camera may be attached to an individual's body by said strap to prevent loss and breakage of the camera when withdrawn from said holster.

* * * * *